United States Patent [19]
Betschart

[11] 3,771,322
[45] Nov. 13, 1973

[54] MANIFOLDING FOR FROZEN CONFECTION MACHINE

[75] Inventor: Robert J. Betschart, Sacramento, Calif.

[73] Assignee: FMC Corporation, San Jose, Calif.

[22] Filed: Feb. 24, 1971

[21] Appl. No.: 118,268

[52] U.S. Cl.............. 62/345, 141/104, 137/515.7, 285/137 R, 425/130
[51] Int. Cl............................................. F25c 7/04
[58] Field of Search..................... 141/101, 104, 82, 141/183, 129; 425/130, 257, 345; 62/380; 285/137 R; 137/515.7, 539

[56] References Cited
UNITED STATES PATENTS

| | | | |
|---|---|---|---|
| 1,602,647 | 10/1926 | Carr............................... | 137/539 X |
| 3,189,046 | 6/1965 | Callahan et al.................. | 137/515.7 |
| 3,469,863 | 9/1969 | Riester et al..................... | 285/137 R |
| 3,632,245 | 1/1972 | Getman ............................ | 141/160 |
| 2,850,051 | 9/1958 | Rasmusson ........................ | 141/160 |
| 3,249,133 | 5/1966 | Goodman et al................... | 141/160 |

Primary Examiner—William E. Wayner
Attorney—F. W. Anderson and C. E. Tripp

[57] ABSTRACT

An indexed conveyor carries transverse rows of molds beneath a manifold block. The manifold block is connected by hoses to a pair of dispersing units each of which has two reservoirs. Thus a fill pattern of four different flavors can be set up for each row of molds.

1 Claim, 7 Drawing Figures

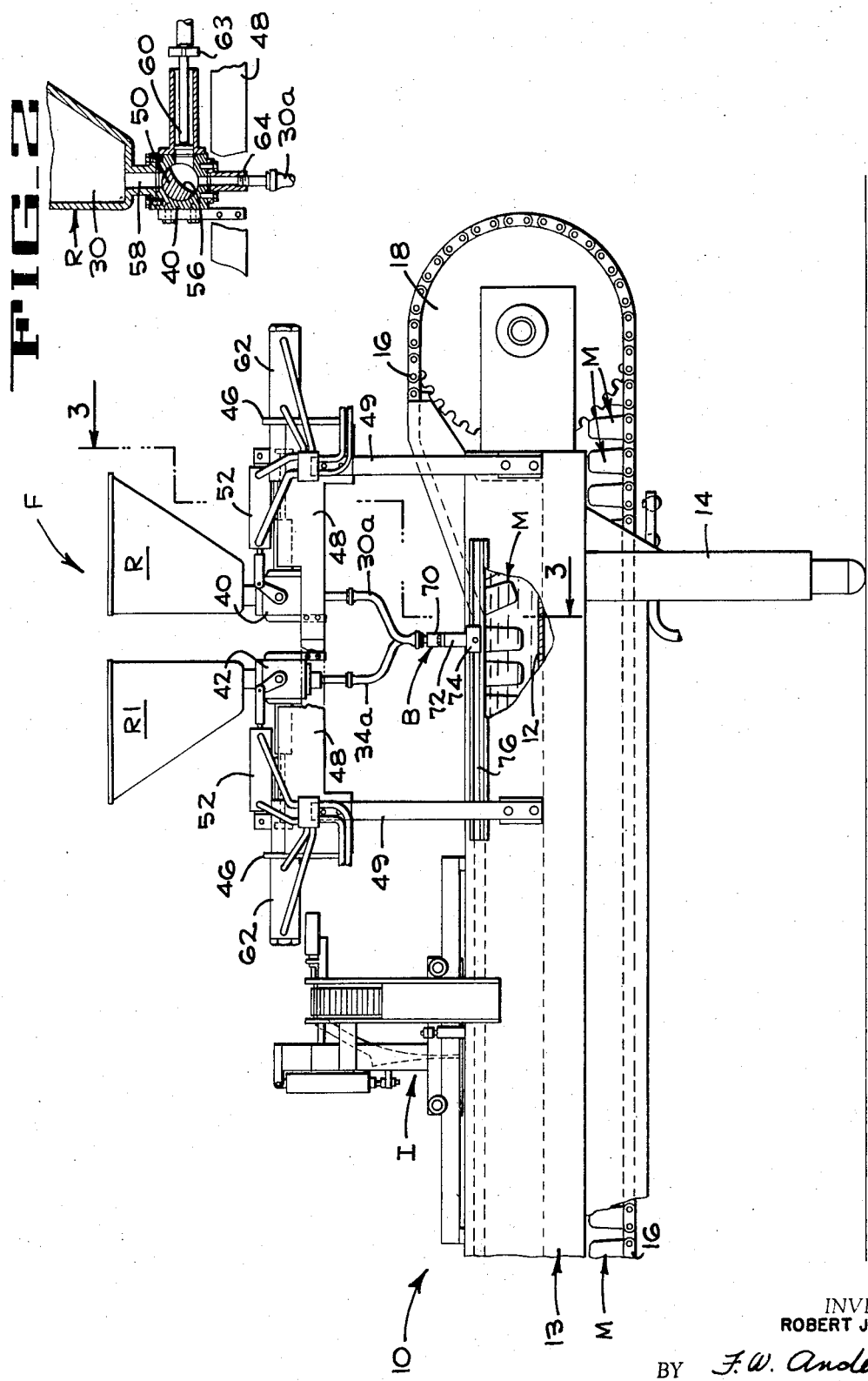

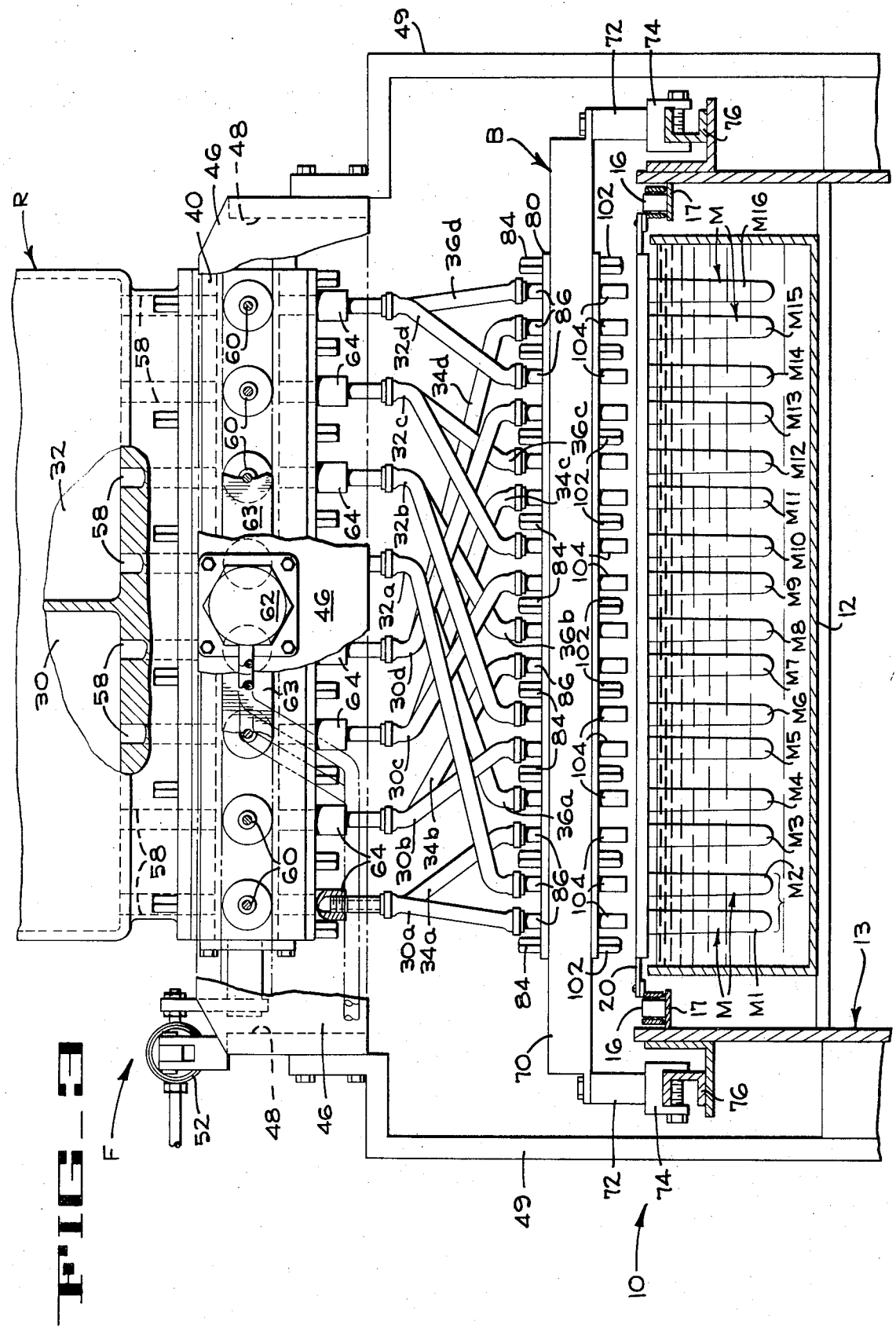

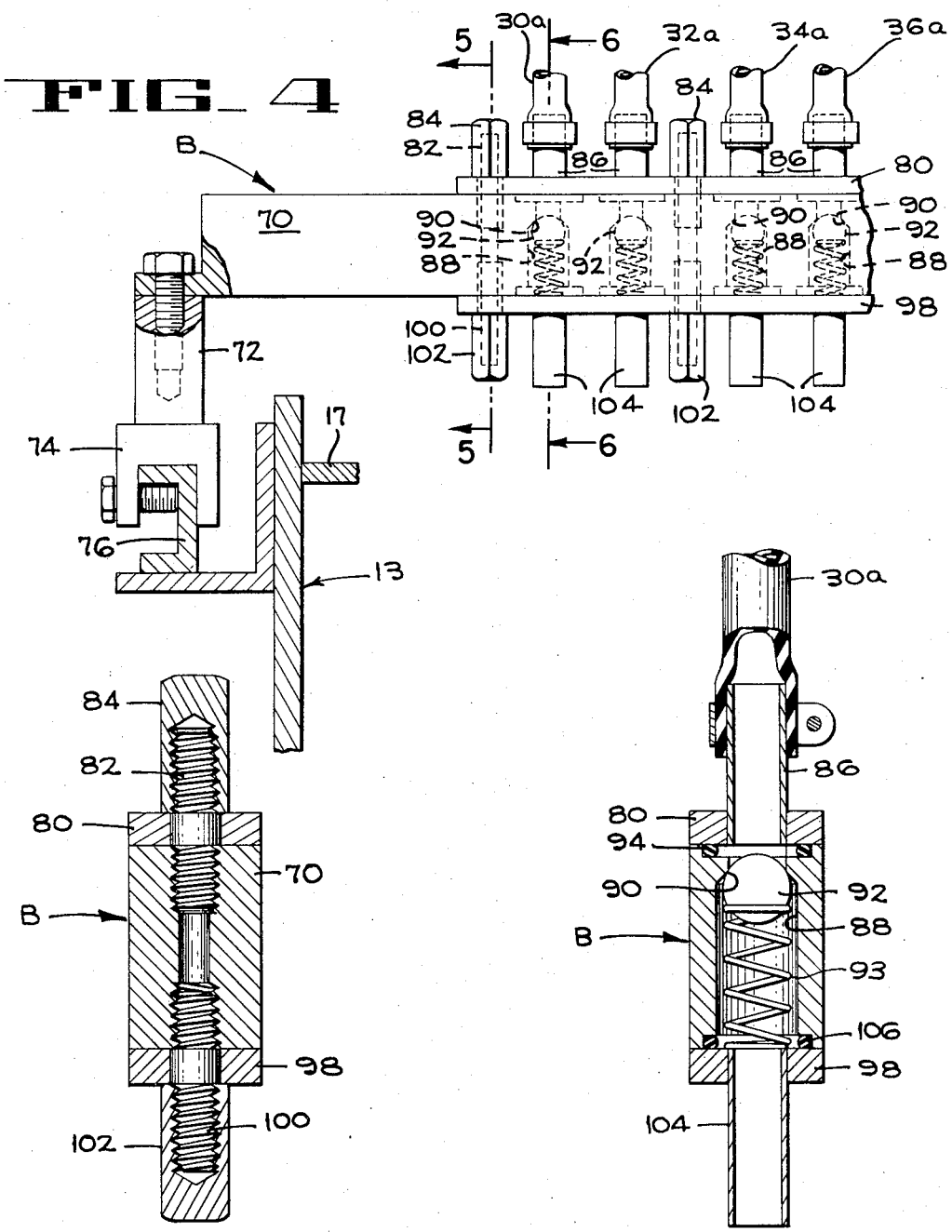

MANIFOLDING FOR FROZEN CONFECTION MACHINE

DESCRIPTION OF PRIOR ART

The United States patent to Fowler et al. U.S. Pat. No. 3,450,070, June 17, 1969, discloses a confection machine having a multi-flavor filler for filling alternate molds with different flavors, the nozzles of which depend directly from metering pumps connected to the reservoirs.

The patent to Otken, U.S. Pat. No. 3,468,265, Sept. 23, 1969, discloses a frozen confection machine having multiple reservoirs, the outlets of which are connected directly to a complex dispensing manifold block with tortuous passages.

The patent to Otken, U.S. Pat. No. 3,279,393, Oct. 19, 1966 shows another form of complex dual nozzle manifold nozzle block.

The patent to Ninneman et al., U.S. Pat. No. 2,975,809, Mar. 21, 1961, shows manifold blocks connected directly to the dispensing mechanism with swivel-mounted filler nozzles mounted directly on the manifold blocks.

The patent to Rasmusson, U.S. Pat. No. 2,850,051, Sept. 2, 1958, shows filler nozzles on a dispensing manifold block depending directly from the reservoir and at FIG. 4 shows spring-loaded check valves at the lower ends of the filler nozzles.

SUMMARY OF THE INVENTION

The frozen confection machine of the present invention facilitates the filling of various molds in a transverse row of molds on an index conveyor in a preselected flavor pattern. The flavor pattern for the rows of molds can be quickly modified by the user of the machine by simply cutting hoses to various lengths and connecting them as dictated by the filling pattern.

The filling apparatus of the present invention has the feature that a completely separate manifold block is employed, that is, the block is not mechanically mounted on the filler dispensing mechanism. The manifold block is of straight through flow design, thereby facilitating cleaning of its passages.

Selected filling patterns from a plurality of reservoirs can be employed by the use of hoses cut to the proper length and connected between dispenser nozzles of the filler reservoirs and the inlet passages to the angle independent manifold block that performs the actual filling operation. Another feature of this invention is the incorporation of spring loaded check valves in the passages of the manifold block to prevent drip between filling operations.

DETAILED DESCRIPTION OF THE DRAWINGS

FIG. 1 is a side elevation of a straight line frozen confection machine embodying the invention, with the defrosting and extraction end of the machine omitted.

FIG. 2 is a section through a dispensing unit.

FIG. 3 is a section taken on 3—3 of FIG. 1 showing the relation of the dispenser units and the manifold block to a row of molds.

FIG. 4 is an enlarged fragmentary front view of one end of the manifold block.

FIGS. 5 and 6 are sections taken through the manifold block on the lines indicated on FIG. 4.

DETAILED DESCRIPTION

Figure 7:
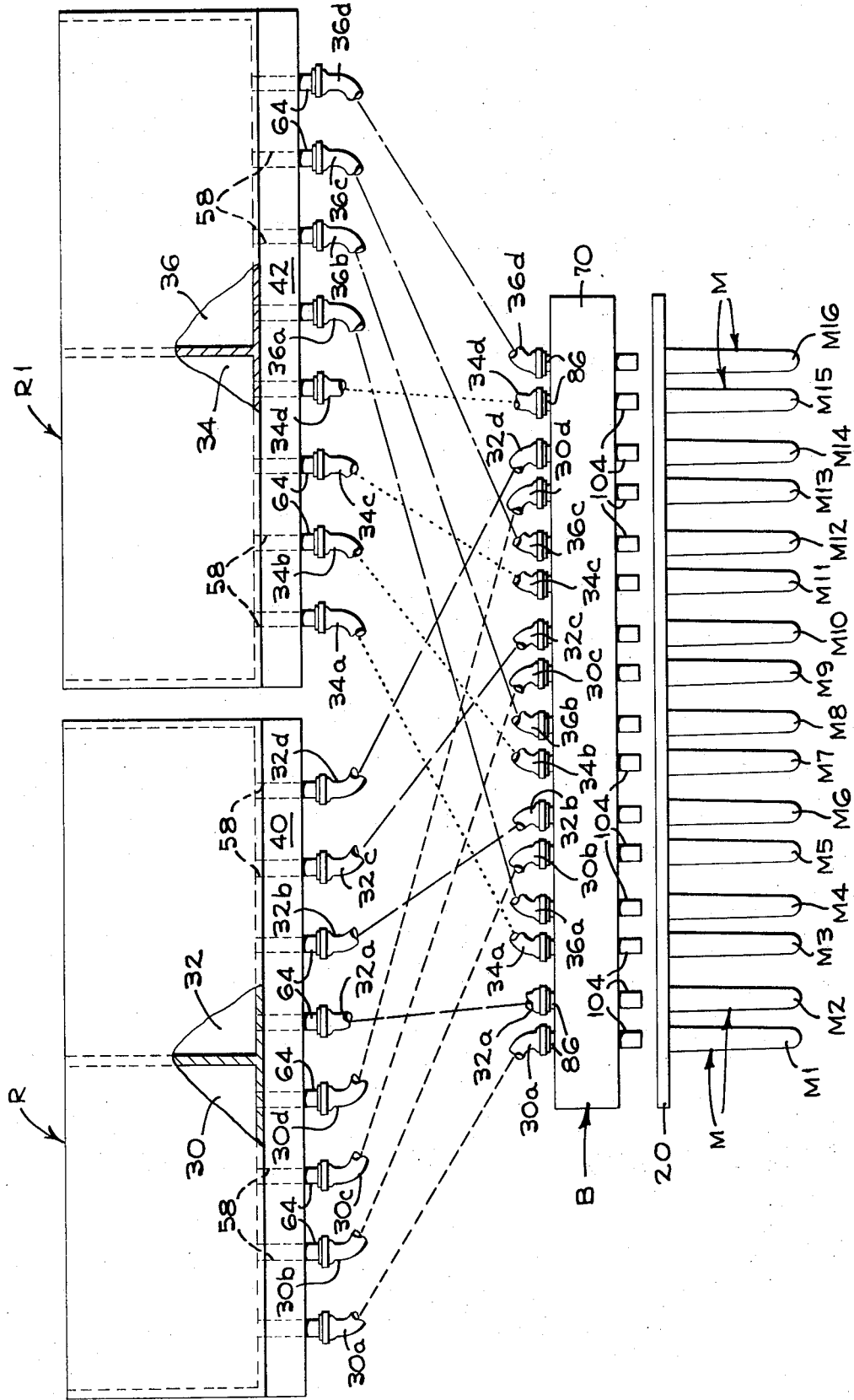
FIG. 7 is a schematic diagram of the hose connections for a selected filling pattern from four individual reservoirs.

FIGS. 1 and 3 show a frozen confection machine 10 embodying the invention and the form illustrated is of the straight line, indexing conveyor type. The filling mechanism improvement of the present invention is illustrated as incorporated in a frozen confection machine such as that shown in the patent to Rasmusson, U.S. Pat. No. 3,031,978, May 1, 1962. Although it will be understood that other types of indexed machine can be utilized.

Only the upstream end of the upstream end of the machine appears in FIG. 1, it being understood that the details of the defrosting and extraction mechanism are not critical to the present invention and apparatus such as that disclosed in the aforesaid Rasmusson machine could be employed.

The machine 10 includes a long brine tank 12 having frame structure 13 supported on legs 14. The machine has an index conveyor comprising endless parallel side chains 16 (see FIG. 3), which are guided on tracks 17 and pass around upstream idler sprockets 18, one of which appears in FIG. 1. Similar sprockets are mounted at the delivery end of the machine (not shown) and these sprockets are intermittently driven for indexing the mold conveyor in accordance with well known principles that have been exemplified by the aforesaid Rasmusson patent.

Connected at spaced intervals along the conveyor side chains 16 are mold plates 20 (FIG. 2) from which depend open top molds indicated generally at M of well known construction. In the fill configuration illustrated in FIG. 3, the molds M can be considered as representing "half molds" in that each mold is half the width of a conventional mold, the latter having a dimension indicated by a bracket (FIG. 3) for purposes of comparison. Thus, in the fill pattern of FIG. 3, sixteen half molds M1 – M16 fit onto a transverse mold bar 20 that would normally accommodate 8 full molds of conventional proportions.

In the embodiment of the invention illustrated, a multi-reservoir filler assembly indicated generally at F is arranged to fill each transverse row of molds M1 – M16 with a pattern of four flavors or differently constituted products. In FIG. 1 the filler dispenses to molds that have just entered the brine tank 12, but it can be dispensed farther upstream as in Rasmusson, U.S. Pat. No. 3,031,978. A conventional stick inserter I is shown downstream of the filler F.

As seen in FIG. 1, the filler F comprises dual reservoirs R and R1 but as seen in FIG. 3, the reservoir R is compartmented into two individual reservoirs 30 and 32. Also, as is indicated in the diagram of FIG. 7, the reservoir R1 is compartmented into two individual reservoirs 34 and 36.

The individual reservoirs 30 and 32 of the reservoir unit R are all connected by a dispensing nozzle block indicated generally at 40 and the individual reservoirs 34 and 36 of the unit R1 have secured thereto a dispensing block 42 of the same construction. As seen in FIG. 7, and as will be explained in detail presently, the reservoirs 30, 32, 34 and 36 each serve four sets of hoses 30a – 30d, 32a – 32d, 34a – 34d and 36a – 36d, and all of these hoses connect to a common manifold block B.

The major components of the dispensers 40,42 will now be described, it being understood that their internal details are not critical to the present invention, and the constructions illustrated are like those shown in Rasmusson, U.S. Pat. No. 2,850,051. Since the reservoir units R, R1 are substantially identical, only the dispensing unit 40 for the reservoir R will be described briefly.

The dispenser block 40 runs transversely of the apparatus (FIG. 3) and is supported by a transverse plate 46 (FIG. 2) which is supported on longitudinal rails 48, the latter being supported by legs 49 (FIG. 1) extending up from the frame 13.

The blocks 40,42 each contain a rotary valve 50 (FIG. 2) which is oscillated 90° by a fluid piston 52 and associated linkage, all as described in detail in the aforesaid Rasmusson, U.S. Pat. No. 2,850,051.

The valve 50 is operated by the fluid piston 52 (FIG. 1) and has a row of arcuate cutouts 56 (FIG. 2) that alternately connect ports 58 from the individual reservoirs to dispensing plungers 60. The latter are operated by a fluid piston 62 and a crossbar 63 connected to all plungers. When the valve 50 is in one position, retraction of the plungers 60 draw in a measured quantity of product. When the valve is turned to the position shown in FIG. 2, the plungers 60 are advanced to dispense the product through dispensing nozzles 64, there being four of these nozzles for each of the reservoir units 30, 32, 34 and 36. The nozzles 64 connect to the hoses 30a to 30d, 32a to 32d, 34a to 34d and 36a to 36d as can be seen partially in FIG. 3 and completely in FIG. 7. As shown in FIG. 1, the valves 50 and the dispensing plungers 60 for the blocks 40,42 are operated by duplicate sets of fluid motors 52,62 and these motors are operated in synchronism by a control circuit, the details of which are not critical to the present invention.

The construction of the manifold B of the present invention appears in FIGS. 4, 5 and 6. The manifold comprises a transverse square bar 70 secured at its ends to brackets 72 that mount clamps 74. These clamps can be adjustably positioned along rails 76 at each side of the machine frame 13. This mounting provides for precise alignment of the manifold block B with the molds M, when the latter have indexed to their charge-receiving position.

As seen in FIG. 5, the bar 70 mounts on upper or inlet nozzles plate 80 by means of studs 82 threaded into the bar and nuts 84. Seen in FIG. 6, the inlet plate 80 has a row of nipples 86 for receiving one of the hoses such as the hose 30a. The bar 70 is formed with sixteen through bores 88, lined up with the inlet nipples 86 and having check valve seats 90 closed by a spring loaded check valve 92. O-ring seals 94 make fluid tight seal around the passages in the plate 80, the nipples 86 and the through bores 88 in the bar 70.

On the underface of the bar 70 a lower or outlet cover plate 98 is secured by studs 100 (FIG. 5) and nuts 102. The plate 98 mounts 16 filler nozzles 104 and is sealed against the bar 70 by means of O-rings 106.

As previously mentioned, it is a feature of the invention that preselected filler patterns can be set by merely cutting to length pieces of hose and connecting them between the nipples 64 on the dispensers 40,42 and the inlet nipples 86 on the manifold block B. Thus, as seen in the diagram of FIG. 7, where four individual reservoirs 30, 32, 34 and 36 are used, a row of sixteen molds can be filled with four different flavors or products. Of course, if one or more of the individual reservoir units 30, 32, 34 or 36 are filled with the same flavor, a simpler filling pattern can be provided.

The manifold block B can be readily detached from the hoses, disassembled and cleaned and the hoses themselves can also be removed and cleaned or replaced with new, sterile hoses. Because of its flexible hose connections, the manifold block B can be precisely positioned relative to the molds without movement of the relatively large reservoirs R, R1. Various filling patterns can be selected by the simple expedient of cutting and fitting lengths of hoses between the dispenser unit nipples and those on the manifold block.

Although the best mode contemplated for carrying out the present invention has been herein shown and described, it will be apparent that modification and variation may be made without departing from what is regarded to be the subject matter of the invention.

What I claim is:

1. A frozen confection machine of the type including an indexing conveyor having a plurality of transverse rows of open top molds, means for passing said molds through a freezing tank, a multi-reservoir filler mechanism embodying dispensing means for filling the molds of each row with different products while the conveyor is stationary, said dispensing means comprising a plurality of depending hose nipples for dispensing from said reservoirs, a transverse manifold disposed beneath said dispensing nipples and above the row of molds to be filled, said manifold comprising a transverse bar having a straight through vertical passage for each dispensing nipple, means connecting each passage to an inlet nipple and to a filler nozzle, and flexible hoses connected between said dispensing nipples and the inlet nipples on said manifold; the improvement wherein said manifold comprises a generally rectangular transverse bar, an elongate outlet plate secured to the lower side of said bar and which mounts said manifold filler nozzles, an elongate inlet plate secured to the upper side of said bar and which mounts said manifold inlet nipples, O-ring seals surrounding both ends of each through passage in said bar and making sealing engagement with the bar and the associated inlet and outlet plates, means for detachably securing said plates to said bar, a spring closed check valve in each through passage in said bar and arranged to be opened only by liquid under dispensing pressure flowing through each inlet passage, the seats for said check valves being formed in the inlet passages of said bar adjacent said elongate inlet plate, and check valve springs extending between said outlet plate and the check valves.

* * * * *

UNITED STATES PATENT OFFICE
CERTIFICATE OF CORRECTION

PATENT NO. : 3,771,322
DATED : November 13, 1973
INVENTOR(S) : ROBERT J. BETSCHART It is certified that error appears in the above-identified patent and that said Letters Patent are hereby corrected as shown below:

Column 3, line 61 - insert after the period -- A valve spring 93 extends between the valve 92 and the outlet plate 98. --.

Signed and sealed this 29th day of April 1975.

(SEAL)
Attest:

RUTH C. MASON
Attesting Officer

C. MARSHALL DANN
Commissioner of Patents
and Trademarks